United States Patent
Wallace et al.

(10) Patent No.: US 9,863,766 B2
(45) Date of Patent: Jan. 9, 2018

(54) CALIBRATION OF A CONTACT PROBE

(71) Applicant: RENISHAW PLC, Wotton-Under-Edge, Gloucestershire (GB)

(72) Inventors: David S Wallace, Nympsfield (GB); Jean-Louis Grzesiak, Mareuil-lès-Meaux (FR)

(73) Assignee: RENISHAW PLC, Wotton-Under-Edge (GB)

( * ) Notice: Subject to any disclaimer, the term of this patent is extended or adjusted under 35 U.S.C. 154(b) by 57 days.

(21) Appl. No.: 14/900,036

(22) PCT Filed: Jun. 26, 2014

(86) PCT No.: PCT/GB2014/051951
§ 371 (c)(1),
(2) Date: Dec. 18, 2015

(87) PCT Pub. No.: WO2014/207470
PCT Pub. Date: Dec. 31, 2014

(65) Prior Publication Data
US 2016/0138911 A1    May 19, 2016

(30) Foreign Application Priority Data
Jun. 28, 2013    (GB) .................................. 1311600.9

(51) Int. Cl.
*G01B 21/00*    (2006.01)
*G01B 21/04*    (2006.01)
(Continued)

(52) U.S. Cl.
CPC ........... *G01B 21/042* (2013.01); *B25J 9/1692* (2013.01); *B82Y 35/00* (2013.01); *G01D 18/00* (2013.01); *G01Q 40/00* (2013.01)

(58) Field of Classification Search
CPC ....................................................... B25J 9/1692
(Continued)

(56) References Cited

U.S. PATENT DOCUMENTS

| | | | | | |
|---|---|---|---|---|---|
| 4,369,581 A | * | 1/1983 | Lenz | ........................ | G01B 5/25 33/1 M |
| 4,437,151 A | * | 3/1984 | Hurt | ..................... | G01B 21/042 33/503 |

(Continued)

FOREIGN PATENT DOCUMENTS

| CN | 1582384 A | 2/2005 |
|---|---|---|
| CN | 101772690 A | 7/2010 |

(Continued)

OTHER PUBLICATIONS

International Search Report PCT/GB2014/051951, dated Dec. 31, 2014, 3 pages.*

(Continued)

*Primary Examiner* — Clayton E Laballe
*Assistant Examiner* — Kevin Butler
(74) *Attorney, Agent, or Firm* — Oliff PLC

(57) ABSTRACT

A method of calibrating a contact probe having a contact element includes measuring with the contact probe a first geometric property of a calibrated artifact and a second geometric property of the or a further calibrated artifact. The first and second geometric properties are such that a deviation between a measured value and the expected value, resulting from a difference between an effective diameter of the contact element and an assumed diameter used for determining the measured value, has the opposite sign for each of the first and second geometric properties. The method further includes identifying a difference in the effective diameter of the contact element from the assumed diameter including comparing deviations of the measured (Continued)

US 9,863,766 B2

Page 2 value to the expected value for each of the first and second geometric properties to determine whether there is a difference in the deviations.

16 Claims, 7 Drawing Sheets

(51) Int. Cl.
  *B25J 9/16* (2006.01)
  *G01D 18/00* (2006.01)
  *G01Q 40/00* (2010.01)
  *B82Y 35/00* (2011.01)
(58) Field of Classification Search
  USPC .......................................................... 73/1.79
  See application file for complete search history.

(56) References Cited

U.S. PATENT DOCUMENTS

| | | | | |
|---|---|---|---|---|
| 4,523,450 | A * | 6/1985 | Herzog | G01B 21/042 33/502 |
| 4,866,643 | A * | 9/1989 | Dutler | G01B 21/045 33/504 |
| 4,875,177 | A * | 10/1989 | Jarman | G01B 11/005 33/504 |
| 4,945,501 | A * | 7/1990 | Bell | G01B 7/008 318/632 |
| 5,125,261 | A * | 6/1992 | Powley | G01B 21/042 33/502 |
| 5,189,806 | A * | 3/1993 | McMurtry | G01B 21/04 33/503 |
| 5,430,948 | A * | 7/1995 | Vander Wal, III | G01B 21/042 33/502 |
| 5,501,096 | A * | 3/1996 | Stettner | G01B 21/042 33/503 |
| 5,583,443 | A * | 12/1996 | McMurtry | G01B 7/008 324/601 |
| 5,657,549 | A * | 8/1997 | Shen | G01B 21/045 33/503 |
| 5,665,896 | A * | 9/1997 | McMurtry | G01B 21/042 73/1.75 |
| 5,687,293 | A * | 11/1997 | Snell | B25J 9/1692 318/568.13 |
| 6,112,423 | A * | 9/2000 | Sheehan | G01B 21/042 33/502 |
| 6,434,846 | B1 * | 8/2002 | McMurtry | B82Y 15/00 33/502 |
| 6,580,964 | B2 * | 6/2003 | Sutherland | G01B 21/042 700/193 |
| 6,591,208 | B2 * | 7/2003 | Lotze | G01B 21/045 702/152 |
| 7,055,367 | B2 | 6/2006 | Hajdukiewicz et al. | |
| 7,142,313 | B2 * | 11/2006 | Ishitoya | G01B 21/045 33/503 |
| 7,249,002 | B1 * | 7/2007 | Ben-Dov | B82Y 35/00 702/190 |
| 7,278,222 | B2 * | 10/2007 | Maier | B23Q 17/22 33/502 |
| 7,318,284 | B2 * | 1/2008 | McMurtry | G01B 21/042 33/503 |
| 7,543,393 | B2 * | 6/2009 | McMurtry | G01B 21/042 33/502 |
| 7,685,726 | B2 * | 3/2010 | Fuchs | G01B 21/045 33/503 |
| 7,866,056 | B2 * | 1/2011 | Ould | G01B 21/042 33/503 |
| 7,900,367 | B2 * | 3/2011 | Sutherland | G01B 21/042 33/502 |
| 7,905,027 | B2 * | 3/2011 | MacManus | G01B 21/10 33/502 |
| 7,912,572 | B2 * | 3/2011 | Du | B23Q 17/22 700/174 |
| 8,250,952 | B2 * | 8/2012 | Maxted | G05B 19/401 82/1.11 |
| 8,296,098 | B2 * | 10/2012 | Mills | G01B 5/20 33/553 |
| 8,336,219 | B2 * | 12/2012 | Grzesiak | G01B 21/042 33/502 |
| 8,561,309 | B2 * | 10/2013 | Fujimoto | G01B 5/20 33/503 |
| 8,939,008 | B2 * | 1/2015 | McMurtry | G01B 3/30 73/1.75 |
| 9,506,736 | B2 * | 11/2016 | Oki | G01B 5/008 |
| 2003/0009257 | A1 | 1/2003 | Sutherland et al. | |
| 2010/0132432 | A1 * | 6/2010 | Wallace | G01B 21/045 73/1.75 |
| 2012/0185210 | A1 * | 7/2012 | Takanashi | G01B 5/201 702/168 |
| 2012/0250178 | A1 * | 10/2012 | Hirano | G11B 5/66 360/59 |

FOREIGN PATENT DOCUMENTS

| | | |
|---|---|---|
| CN | 102472605 A | 5/2012 |
| WO | 0025087 A1 | 5/2000 |
| WO | 2008102109 A1 | 8/2008 |
| WO | 2009010721 A1 | 1/2009 |
| WO | 2011002501 A1 | 1/2011 |
| WO | 2011107729 A1 | 9/2011 |
| WO | 2011107746 A1 | 9/2011 |
| WO | 2012004555 A1 | 1/2012 |

OTHER PUBLICATIONS

Written Opinion of the International Search Report PCT/GB2014/051951, dated Dec. 28, 2015 7 pages.*
IPO United Kingdom Application GB1311600.9, dated Sep. 17, 2013, 2 pages.*
Nov. 14, 2014 International Search Report issued in International Patent Application No. PCT/GB2014/051951.
Sep. 17, 2013 Search Report issued in British Patent Application No. 1311600.9.
Nov. 14, 2014 Written Opinion issued in International Patent Application No. PCT/GB2014/051951.
Jul. 27, 2017 Office Action issued in Chinese Patent Application No. 201480047005.8.

* cited by examiner

CALIBRATION OF A CONTACT PROBE

FIELD OF INVENTION

This invention concerns a method and apparatus for calibrating a contact probe and, in particular, to determine a dimension of a contact element, such as a stylus tip.

BACKGROUND

It is common practice after workpieces have been produced to inspect them on a positioning apparatus such as a coordinate measuring machine (CMM) or other type of coordinate positioning apparatus. Such coordinate positioning apparatus typically have a quill onto which a contact probe, such as a touch trigger probe or scanning probe, is mounted such that the contact probe can be driven in three orthogonal directions X, Y, Z within a working volume of the machine.

U.S. Pat. No. 5,189,806 describes an articulating probe head capable of orientating a contact probe with two rotational degrees of freedom to enable the probe to be used in an operation for measuring the surface of workpieces. In general, such a probe head includes two rotary drive mechanisms which enable a contact probe to be orientated about two substantially orthogonal rotary axes. Such an articulating probe head may be mounted on the quill of a CMM to enable the probe to be positioned in 5 degrees of freedom (i.e. 3 linear degrees of freedom provided by the CMM and 2 rotary degrees of freedom provided by the articulating probe head).

The contact probe has a contact element, such as a stylus tip, for contacting surfaces of the workpiece to cause deflection of a stylus of the probe, the probe generating signals in response to the deflection. A stylus tip is usually calibrated before the probe is used to measure a workpiece. It is known to calibrate the stylus tip diameter by measuring a calibrated sphere (so called Master Ball) with the probe. This measurement may be carried out at different orientations of the probe, for example as disclosed in WO00/25087 or WO2011/002501. However, a disadvantage with such a method is that it is reliant on the accuracy of the coordinate positioning machine and/or probe head and is time consuming.

SUMMARY OF INVENTION

According to a first aspect of the invention there is provided a method of calibrating a contact probe having a contact element, the method comprising measuring with the contact probe a first geometric property of a calibrated artefact and a second geometric property of the or a further calibrated artefact, the first and second geometric properties being such that a deviation between a measured value and an expected value of the geometric property, resulting from a difference between an effective diameter of the contact element and an assumed diameter used for determining the measured value, has the opposite sign for each of the first and second geometric properties, and identifying a difference in the effective diameter of the contact element from the assumed diameter comprising comparing the deviations of the measured value to the expected value for each of the first and second geometric properties to determine whether there is a difference in the deviations.

From the measurements of the first and second geometric properties, deviations in the measurements from the expected value due to a difference between an effective diameter of the contact element and its assumed diameter can be identified (decoupled) from deviations due other aspects of the probe, a rotary head and/or a coordinate positioning machine to which the probe is attached. In particular, measurement errors resulting from a difference in the contact element from its assumed size invert when measuring the geometric properties of the first and second geometric properties, whereas measurement errors resulting from a difference in a length of the probe from its assumed length, a difference in temperature from a temperature at which the artefact was calibrated or originating from a rotary head and/or coordinate positioning apparatus controlling movement of the contact probe may not invert when measuring the geometric properties. Accordingly, the presence of an inversion in an error in measuring the geometric properties (seen as a difference in deviations of the measured value from the expected value) can be used to identify the difference in an effective diameter of the contact element from its assumed diameter. It will be understood that the total deviations of the measured value from the expected value for the first and second geometric properties may be positive or negative for both the first and second geometric properties if other sources of error have a greater magnitude than the error resulting from a difference in the effective diameter of the contact element from its assumed diameter.

The geometric property may be a dimension of the calibrated artefact or the further calibrated artefact whose value is known. In such an embodiment, the measured value for the dimension is compared to the known dimension and an error in the measured value determined. The errors in measurement for the first and second geometric properties are compared and a difference in the errors used to identify a deviation of the effective diameter of the contact element from its assumed diameter. In another embodiment, the first and second geometric properties are respective locations of first and second surfaces on the calibrated artefact, the relative locations of the first and second surfaces being known (such as the surfaces having common location along an axis normal to the plane). In this way, identifying a difference in the effective diameter of the contact element from the assumed diameter may comprise comparing the measurements of the locations of the first and second surfaces to each other.

The geometric properties may be such that a distance travelled by the contact probe in measuring the geometric property of each of the first and second geometric properties is substantially the same. For instance, the first geometric property may be an internal circular surface of the calibrated artefact and the second geometric property an external circular surface of the further calibrated artefact, the internal circular surface having a diameter that is greater than that of the external circular surface by the assumed diameter of the contact element. By travelling substantially the same distance in measuring both surfaces, non-inverting errors from sources, such as deviations in probe length, temperature, the probe head and coordinate measuring machine, may be equal for both measurements.

Measuring of the first geometric property may comprise measuring a first distance on the calibrated artefact by contacting a first plurality of points on the calibrated artefact, wherein the first distance is determined by adding the assumed diameter to a distance determined from the centre of the contact element when in contact with the first plurality of points, and measuring of the second geometric property may comprise measuring a second distance on the calibrated artefact or the further calibrated artefact by contacting a second plurality of points on the calibrated artefact or the further calibrated artefact, wherein the second distance is determined by taking away the assumed diameter from a distance determined from the centre of the contact element when in contact with the second plurality of points. For example, the first geometric property may be a diameter of an internally facing circular surface of an artefact and the second surface may be a diameter of an externally facing circular surface of the calibrated artefact or the further calibrated artefact. In such an embodiment, identifying a difference in the effective diameter of the contact element from the assumed diameter may comprise comparing the deviations of the measured distances to the expected value for each distance. A difference in the deviations may indicate a difference in the effective diameter of the contact element from the assumed diameter. Measuring of the first and second geometric properties may comprise measuring a distance between points on first and second surfaces that face in opposed directions, the distance measurements being in a direction normal to each surface at the measured point. The first and second surfaces may be planar surfaces facing in opposed directions and the distance measured in a direction along an axis normal to a plane of the surfaces. In this alternative embodiment, the geometric property is a location of each of the first and second surfaces. Preferably, the location of each surface is substantially the same. Accordingly, a comparison of the measured distance to the expected zero length identifies a difference in the effective diameter of the contact element from the assumed diameter. Other sources of errors may not apply or may be insignificant (such as encoder errors) because of the zero distance between the surfaces.

The first and second geometric properties may be determined from measurements on different surfaces on a common artefact, such as internal and external surfaces of an artefact or different parts of a continuous surface. Alternatively, the first and second geometric properties may be determined from measurements on surfaces of different artefacts. The method may comprise locating the different artefacts at approximately the same position in a coordinate positioning machine for measurement with the contact probe.

The method may comprise determining the first geometric property by measuring a plurality of points on the calibrated artefact and determining the second geometric property by measuring a plurality of points on the calibrated artefact or the further calibrated artefact, the geometric property determined by fitting a curve to the plurality of points. The first geometric property may be determined by measuring a plurality of points on a convex surface and the second geometric property may be determined by measuring a plurality of points on a concave surface. It will be understood that "convex surface" and "concave surface" as used herein are not limited to a single curved surface but includes a series of, possibly straight, surfaces connected at an angle to each other to hollow inwards or bulge outwards, respectively.

The convex and concave surfaces may have a cross-section of substantially the same (2-dimensional) shape. The convex and concave surfaces may have a geometric property that is substantially the same. For example, the convex surface may define a circle or a sphere having a diameter substantially the same as a diameter of a bore defined by the concave surface. Circular features may be particularly suitable for use with a rotary head, which can measure the convex and concave surfaces with the probe at a fixed angle relative to a rotary axis. A possible advantage of convex and concave surfaces having substantially the same shape and dimensions is that a distance traveled by a coordinate positioning machine/rotary head in measuring the surfaces with the contact probe may be substantially the same for both surfaces. Accordingly, errors in the measurements that may occur from sources within the coordinate positioning machine/rotary head, such as encoder errors, may cancel when comparing the two measurements allowing decoupling of errors due to the tip size from errors due to the coordinate measuring machine/rotary head.

It will be understood that "substantially the same" geometric property, shape and dimension may mean that any difference in the corresponding geometric property, shape and dimension of the surfaces is of the order of the diameter of the contact element or less. For example, in one embodiment, the convex surface may have a diameter that is smaller than the diameter of the concave surface. This may ensure that a coordinate positioning machine/rotary head can travel the same distance when measuring both surfaces. A contact element typically may have a diameter of less than 38 mm, preferably less than 26 mm and more preferably, less than 13 mm. A minimum diameter for the contact element may be 20 µm. The difference in diameters between the convex and concave surfaces may be a compromise to accommodate for different contact element sizes such as halfway between the maximum and minimum diameters for the contact element.

The convex and concave surfaces may each be a closed or open surface. The convex surface may be an outwardly facing surface of an artefact and/or the concave surface may be an inwardly facing surface of the artefact or another artefact. The convex surface may be a surface of a sphere or cylinder and/or the concave surface may be a bore or aperture in a ring shaped artefact.

In a further embodiment, the first geometric property may be a distance between a first pair of parallel surfaces facing towards each other and the second geometric property a distance between a second pair of parallel surfaces facing away from each other.

In another embodiment, the first geometric property is determined by measuring a plurality of points on a planar surface that faces in a first direction and the second geometric property is determined by measuring a plurality of points on a planar surface that faces in a second direction opposed to the first direction. The planar surfaces may be surfaces of a single artefact or separate artefacts held together such that the planar surfaces are parallel. The planar surfaces may be positioned in approximately the same plane. The planar surfaces may be provided by two gauge blocks in contact with each other in a staggered arrangement. In this way, a portion of the surface on a side of each block that is in contact with the other block is available for measurement.

The contact probe may be attached to a quill of a coordinate positioning machine, measurement of the first and second geometric properties carried out by moving arms of the coordinate positioning machine.

The contact probe may be attached to a rotary head, measurement of the first and second geometric properties carried out by rotation of the rotary head about an axis.

The rotary head may be mounted on a quill of a coordinate positioning machine. One measurement of the first and second geometric properties may be carried out by rotation of the rotary head with arms of the coordinate positioning machine fixed in position and a further measurement of the first and second geometric properties may be carried out by moving arms of the coordinate positioning machine with the rotary head fixed in position.

The method may comprise measuring a first plurality of geometric properties of one or more calibrated artefacts and/or measuring a second plurality of geometric properties of the one or more calibrated artefacts or a further one or more calibrated artefacts, wherein a deviation between a measured value and an expected value of the geometric property resulting from a difference between an effective diameter of the contact element and an assumed diameter used for determining the measured value has the opposite sign for the first plurality of geometric properties to the second plurality of geometric properties. The first plurality of geometric properties may be geometric properties of first surfaces of the one or more calibrated artefacts having the same or a similar shape but different dimensions. The second plurality of geometric properties may be geometric properties of second surfaces of the one or more calibrated artefacts or the further one or more calibrated artefacts having the same or a similar shape but different dimensions. This may further aid in identifying the difference in the diameter of the contact element from the assumed diameter because any error due this difference will not scale with size, whereas measurement errors due to other factors do scale with size.

The method may comprise measuring the first surface and the second surface when the artefact(s) bearing these surfaces is/are at approximately the same temperature. This may be achieved by carrying out the measurements in quick succession. In this way, temperature changes that may vary the size of the artefact and introduce errors are mitigated.

The method may comprise determining an effective diameter of the contact probe from the measurements of the first and second geometric properties.

According to a second aspect of the invention there is provided a method of calibrating a contact probe having a contact element having an assumed diameter, the method comprising measuring with the contact probe a plurality of points on a surface of a male artefact and a plurality of points on a surface defining an aperture in a female artefact and identifying a difference in a diameter of the contact element from the assumed diameter by comparison of the measurements for each of the male and female artefacts.

The surface of the male artefact may be larger, smaller or the same size as the aperture defined by the female artefact. It will be understood that "male artefact" and "female artefact" as used herein are not limited to complimentary artefacts wherein the male artefact fits snugly in the female artefact.

According to a third aspect of the invention there is provided a method of identifying a difference in a diameter of a contact element of a contact probe from an assumed diameter comprising, receiving measurement data from measuring with the contact probe a plurality of points on a first surface of a first artefact and a plurality of points on a second surface of the first or a further artefact and comparing the measurement data for the first and second surfaces to identify an error in the measurement of the second surface that has inverted from the measurement of the first surface.

According to a fourth aspect of the invention there is provided a data carrier having instructions stored thereon, which, when executed by a processor, cause the processor to carry out the method of the third aspect of the invention.

According to a fifth aspect of the invention there is provided a coordinate positioning machine comprising a contact probe, an articulating device for moving the contact probe and one or more processors for controlling movement of the articulating device to move the contact probe and for receiving signals from the contact probe, wherein the one or more processors are arranged to control the articulating device and process the signals from the contact probe to calibrate the contact probe in accordance with the first or second aspects of the invention.

DESCRIPTION OF EMBODIMENTS

Figure 1:
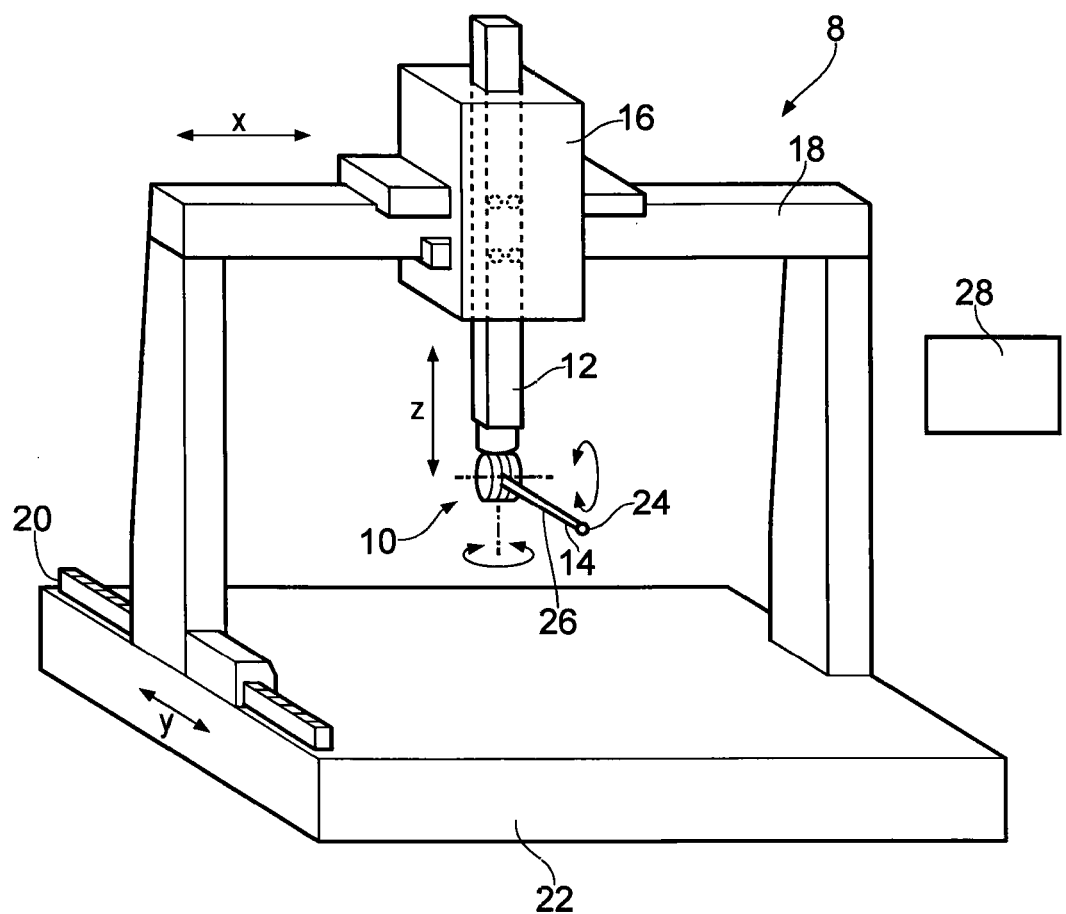
FIG. 1 shows a coordinate positioning machine for carrying out a method according to one embodiment of the invention.

Referring to FIG. 1, a coordinate measuring machine (CMM) 8 comprises a base 22 on which arms 12, 16 and 18 are mounted, the arms moveable to move an end of arm (quill) 12 in 3 linear directions, X, Y, Z. Attached to the quill 12 is a rotary probe head 10 to which a contact probe 14 is attached. The rotary probe head 10 is for rotating the contact probe 14 about two perpendicular axes (indicated by the circular arrows). Accordingly, the combined coordinate measuring machine 8 and rotary probe head 10 provide apparatus that can position the contact probe 14 in 5 degrees of freedom.

The contact probe 14 comprises a stylus 26 mounted for deflection and a stylus tip 24, which in this embodiment is a sphere. The stylus tip 24 is a contact element for contacting surfaces of the workpiece, the probe 14 generating signals on deflection of the stylus 24. The contact probe 14 may be a touch trigger or scanning probe.

The CMM 8 and rotary probe head 10 are in communication with a controller and evaluation unit 28, which generates signals for controlling movement of the CMM 8 and rotary probe head 10 and receives signals from contact probe 14 for processing into measurement data.

Figure 6:
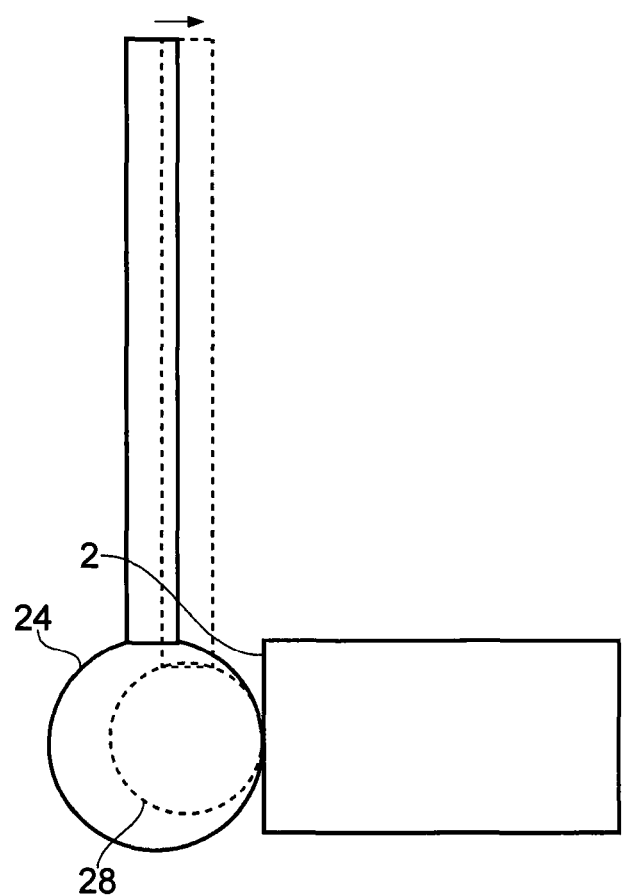
FIG. 6 illustrates the effective diameter of a contact probe.

In use, a position of a centre of the stylus tip 24 is determined from the position encoders (not shown) in the rotary probe head 10 and CMM 8. However, in order to determine an accurate position of the actual point of contact of the stylus tip 24 with the workpiece, a diameter of the stylus tip 24 has to be taken into account. Accordingly, any difference between an assumed diameter used in calculating a position of contact and an effective diameter of the stylus tip 24 will result in inaccuracy in the measurement. As shown in FIG. 6, the effective diameter 28 of the stylus tip 24 may not be its actual diameter because the probe may not generate a signal indicating contact of the stylus tip 24 with a surface 2 immediately on contact with the surface but there may be a small element of "pre-travel" for a touch trigger probe (indicated by the arrow in FIG. 6) before a signal is generated or gain error for a scanning probe. This requirement for the probe to travel a small distance after contact before a signal is generated, effectively makes the diameter of the stylus tip 24 appear smaller than its actual diameter.

It is corrections in this "effective" diameter that are determined by the method described herein.

To determine an effective diameter of the stylus tip 24 a calibration routine is carried out. Referring to FIGS. 2a, 2b, 3a and 3b, the calibration method comprises using the contact probe 10 to measure a plurality of points (illustrated by dotted lines 101, 301) on a first, convex surface 102 of a first, male artefact 100, in this embodiment a calibrated sphere, and a plurality of points (illustrated by dotted lines 201, 401) on a second, concave surface 202 of the second, female artefact 200, in this embodiment a calibrated ring gauge. The two artefacts 100 and 200 may be complimentary in that a diameter of the concave surface 202 of the gauge ring 200 is substantially the same as the diameter of the sphere 100.

Figure 2A:
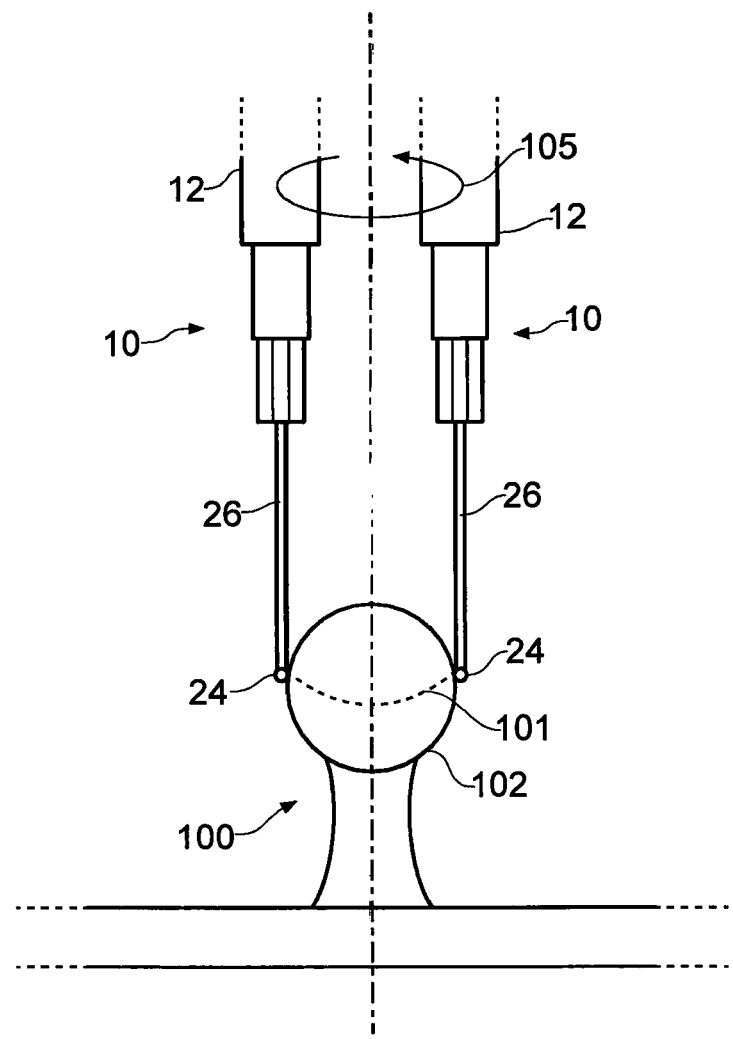
FIGS. 2a and 2b show schematically measurement of a male calibration artefact and female calibration artefact through movement of the coordinate measuring machine quill.
Figure 2B:
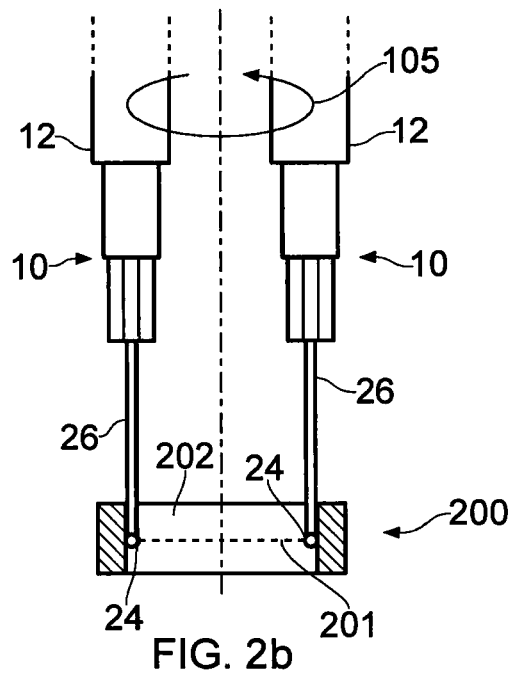
Figure 3A:
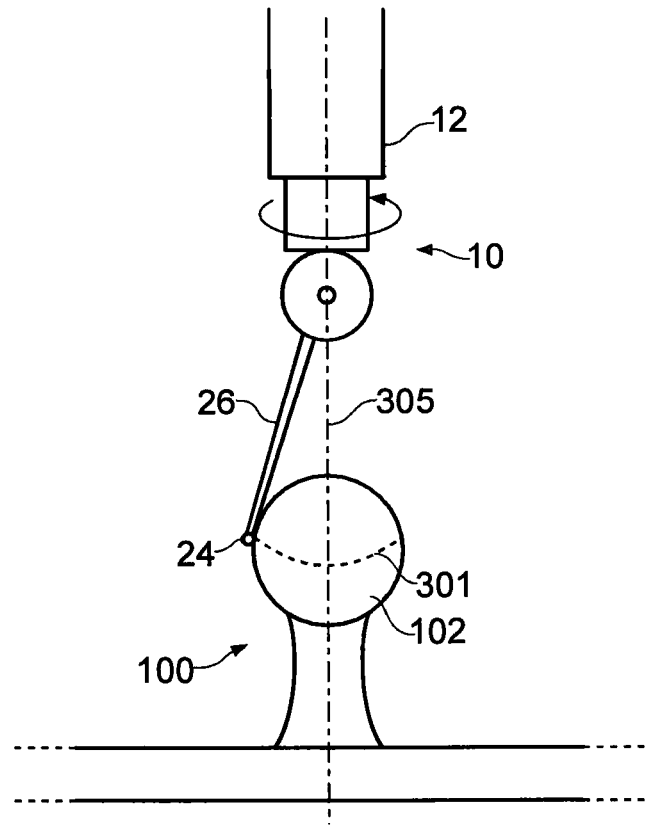
FIGS. 3a and 3b show schematically measurement of the male calibration artefact and female calibration artefact through movement of a rotary probe head.
Figure 3B:
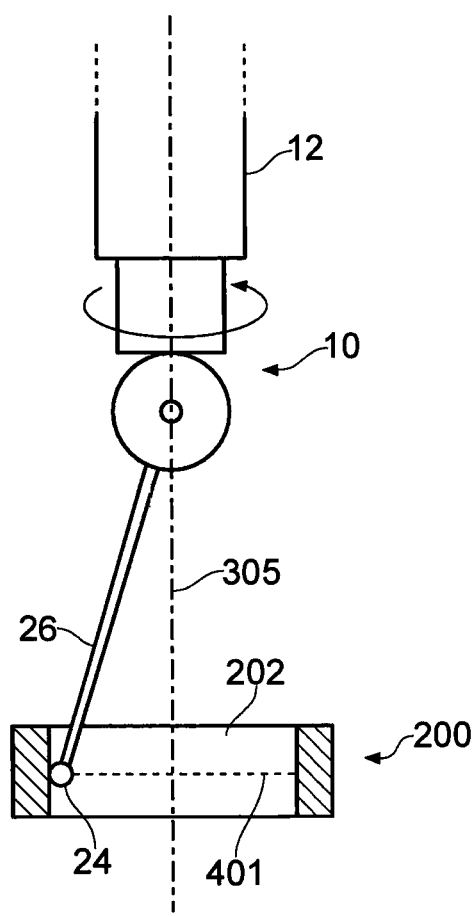

The measurements may be carried out by movement of the X, Y, Z axes of the CMM 8 along a circular path 105 with the rotary axes of the probe head 10 fixed (as shown in FIGS. 2a and 2b) or by rotation of the probe head 10 about one or more of its axes 305 with the probe 26 at a fixed angle to that axis with the linear axes of the CMM 8 fixed (as shown in FIGS. 3a and 3b). Alternatively, the measurements could be carried out through a combination of movements of the CMM 8 and the probe head 10, such as the rotation of the rotary head 10 about the circular path with the CMM 8 moving the probe 26 to touch the surface of the artefact at a plurality of points to make a measurement or the CMM 8 moves the probe 26 in a circular path with the rotary head 10 moving the probe 26 to touch the surface of the artefact at a plurality of points to make the measurements.

The signals from the transducers in the contact probe 26, rotary head 10 and CMM 8 can be used to determine a location of the centre of the stylus tip 24. For each of the artefacts 100, 200, a circle is fitted to the locations of the centre of the stylus tip 24 when in contact with the surface 102, 202 and a diameter of each circle determined. To determine a diameter of the external surface 102 of the sphere 100, the assumed diameter of the stylus tip 24 is negated from the diameter determined for the locations of the centre of the stylus tip 24 when in contact with surface 102 (as the centre of the stylus tip 24 is spaced from the external surface 102 in a direction away from the centre of the circle). A diameter of the internal surface 202 of the gauge ring 200 is determined by adding the assumed diameter of the stylus tip 24 to the diameter of the circle determined for the locations of the centre of the stylus tip 24 when in contact with the internal surface 202 of the gauge ring 200 (as the centre of the stylus tip 24 is spaced from the internal surface 202 in a direction towards the centre of the circle).

In this embodiment, the measured diameters of the external surface 102 of the sphere 100 and the internal surface 202 of the ring gauge 200 are compared to known (expected) diameters for these calibrated artefacts and errors in the measured diameters are compared. A difference in the errors indicates that an effective diameter of the stylus tip 24 may be different from the assumed diameter used to calculate the measurement data. A correction to the assumed diameter can be determined from the difference in the errors. The correction to the assumed diameter to obtain the effective diameter may be equal to half the difference in the measured errors.

In such an embodiment, it may not be necessary to measure separate artefacts but different surfaces on the same artefact may be used, such as external and internal surfaces of a ring gauge.

Typically, the assumed diameter of the stylus tip will be a first guess at calibrating the diameter.

Figure 4:
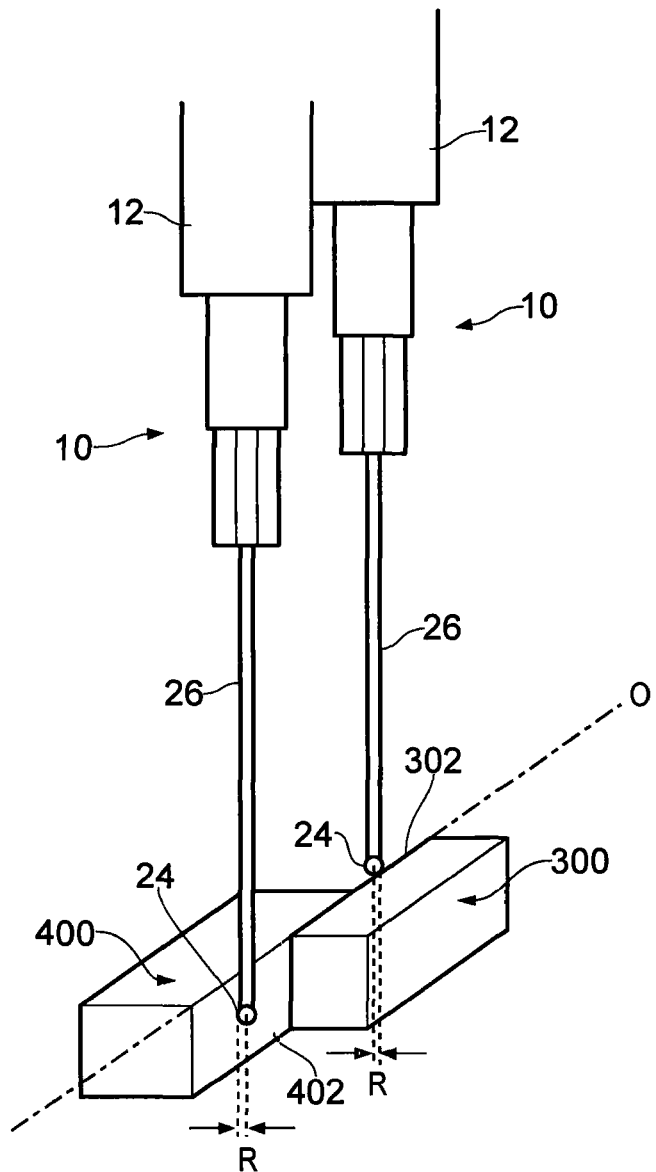
FIG. 4 shows schematically measurements of a further calibration artefact in accordance with another embodiment of the invention.

Referring now to FIG. 4, in an alternative embodiment, surfaces 302 and 402 are measured on two gauge blocks 300 and 400. The gauge blocks 300, 400 are engaged such that partial areas of the surfaces 302, 402 are in contact, ensuring that the surfaces 302, 402 are parallel, lie substantially in the same plane and face in opposite directions. A plurality of points are measured on each surface 302, 402 either through CMM touches and/or rotary head touches. A relative location of the surfaces 302, 402 relative is determined.

A non-zero difference in the relative locations indicates that an effective diameter of the stylus tip 24 is different from the assumed diameter used to calculate the measurement data. A correction to the assumed diameter can be determined from the sign of the difference in the measured locations. For example, if surface 402 is deemed to be spaced to the left of surface 302 (as illustrated in FIG. 4), then this is because the effective diameter is smaller than the assumed diameter, whereas if surface 402 is measured to be to the right of surface 302 then his is because the effective diameter is larger than the assumed diameter. The correction to the assumed diameter to obtain the effective diameter may be equal to the difference in the measured locations.

Figure 5:
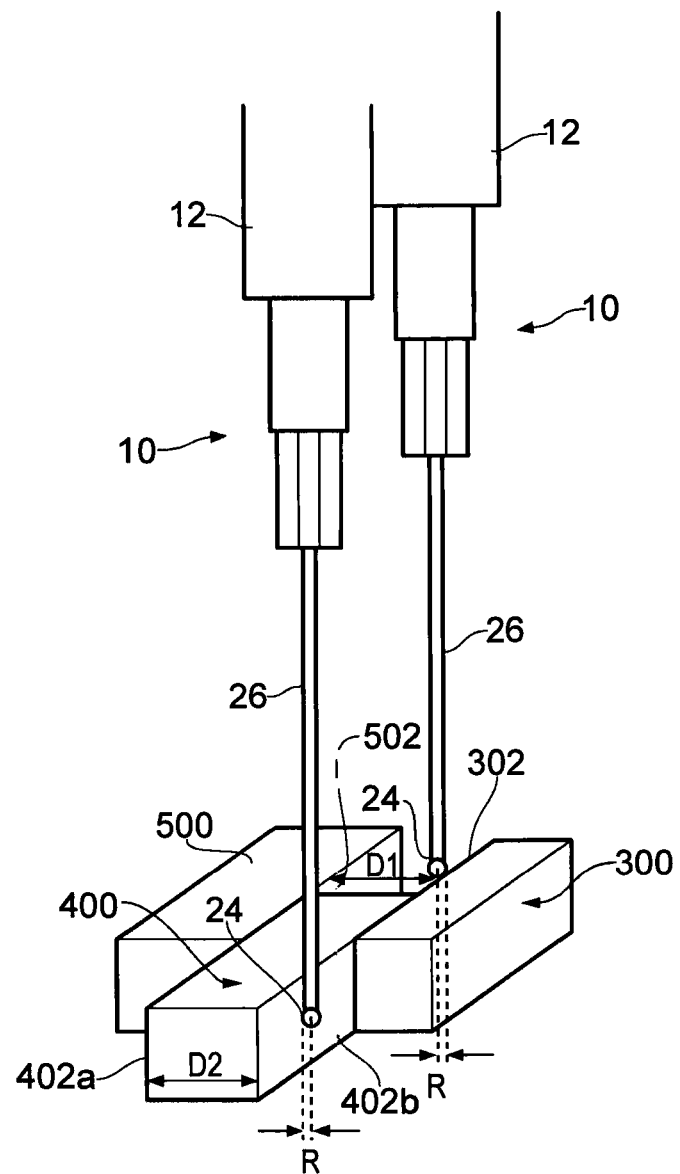
FIG. 5 shows schematically measurement of another calibration artefact in accordance with a yet further embodiment of the invention.

Referring to FIG. 5, three gauge blocks 300, 400 and 500 are engaged together, with gauge block 400 offset from gauge blocks 300 and 500. This provides two pairs of parallel faces/surfaces 302, 502 and 402a, 402b, one pair 302, 502 facing each other and the other pair 402a, 402b facing away from each other. The distance, D1, D2 between the surfaces should be the same.

At least one point is measured on each surface 302, 402, 402a, 402b either through CMM touches and/or rotary head touches. A distance, D1 and D2, between surfaces 302 and 502 and 402a and 402b, respectively, is determined. For surfaces 302, 502, when the stylus tip 24 contacts these surfaces, a centre of the stylus tip 24 is displaced by a distance R towards the other surface 502, 302 of the pair. Therefore, to determine a distance between the surfaces 302, 502, the assumed diameter of the stylus tip 24 is added to the distance between locations of the centre of the stylus tip 24 when contacting surfaces 302, 502. When the stylus tip 24 contacts surfaces 402a, 402b, a centre of the stylus tip 24 is displaced by a distance R away from the other surface 402b, 402a. Therefore, to determine a distance between the surfaces 402a, 402b, the assumed diameter of the stylus tip 24 is taken away from the distance between locations of the centre of the stylus tip 24 when contacting surfaces 402a, 402b of the pair.

The measured distances of the pairs of surfaces 302, 502, 402a, 402b are compared to the known distance. Errors in the measured diameters from the known values are compared. A difference in the errors indicates that an effective diameter of the stylus tip 24 may be different from an assumed diameter used to calculate the measurement data. A correction to the diameter can be determined from the difference in the measured errors. The correction to the assumed diameter to obtain the effective diameter may be equal to half the difference in the errors.

It will be understood that modifications and alterations may be made to the invention as described herein. For example, the male and female artefacts may not be complimentary, e.g. a diameter of the concave surface of the gauge ring may be significantly different from the diameter of the sphere. In scenarios where the sizes of the concave and convex surfaces are significantly different, it may not be necessary that the surfaces are surfaces of different artefacts.

The method may be carried out with a non-linear coordinate positioning machine, such as described in WO2011/

107729 and WO2011/107746. The method may be carried out without the rotary probe head 10, wherein the contact probe 14 is fixed relative to the quill 12 of the coordinate measuring machine 8.

The invention claimed is:

1. A method of calibrating a contact probe having a contact element, the method comprising:
    measuring with the contact probe a first geometric property of a calibrated artefact and a second geometric property of the or a further calibrated artefact, the first and second geometric properties being such that a deviation between a measured value and the expected value, resulting from a difference between an effective diameter of the contact element and an assumed diameter used for determining the measured value, has the opposite sign for each of the first and second geometric properties;
    identifying a difference in the effective diameter of the contact element from the assumed diameter comprising comparing deviations of the measured value to the expected value for each of the first and second geometric properties to determine whether there is a difference in the deviations; and
    determining an effective diameter of the contact probe from the measurements of the first and second geometric property.

2. A method according to claim 1, wherein the first and second geometric properties are such that a distance traveled by the contact probe in measuring the first and second geometric properties is substantially the same.

3. A method according to claim 1, wherein measuring of the first geometric property comprises measuring a first distance on the calibrated artefact by contacting a first plurality of points on the calibrated artefact, wherein the first distance is determined by adding the assumed diameter to a distance determined from the centre of the contact element when in contact with the first plurality of points, and
    measuring of the second geometric property comprises measuring a second distance on the calibrated artefact or the further calibrated artefact by contacting a second plurality of points on the or the further calibrated artefact, wherein the second distance is determined by taking away the assumed diameter from a distance determined from the centre of the contact element when in contact with the second plurality of points.

4. A method according to claim 1, wherein the first and second geometric properties comprise first and second surfaces have a cross-section of substantially the same shape.

5. A method according to claim 4, wherein the first surface is a convex surface and the second surface is a concave surface.

6. A method according to claim 1, wherein the contact probe is attached to a quill of a coordinate positioning machine, measurement of the first and second geometric properties carried out by moving arms of the coordinate positioning machine.

7. A method according to claim 6, wherein a distance traveled by the coordinate positioning machine and/or rotary probe head in measuring the first and second geometric properties with the contact probe is substantially the same for both the first and second geometric properties.

8. A method according to claim 1, wherein the contact probe is attached to a rotary probe head, measurement of the first and second geometric properties carried out by rotation of the rotary probe head about an axis.

9. A method according to claim 8, wherein the rotary probe head is mounted on a quill of a coordinate positioning machine, one measurement of the first and second geometric properties carried out by rotation of the rotary probe head with arms of the coordinate positioning machine fixed in position and a further measurement of the first and second geometric properties carried out by moving arms of the coordinate positioning machine with the rotary probe head fixed in position.

10. A method according to claim 1, wherein the first and second geometric properties are geometric properties of different artefacts.

11. The method according to claim 10, further comprising locating the different artefacts at approximately the same position in a coordinate positioning machine.

12. A method according to claim 10, wherein the different artefacts are a female artefact and a male artefact.

13. A method according to claim 1, further comprising measuring a first plurality of geometric properties of one or more calibrated artefacts and measuring a second plurality of geometric properties of the one or more calibrated artefacts or a further one or more calibrated artefacts,
    wherein a deviation between a measured value and an expected value of the geometric property resulting from a difference between an effective diameter of the contact element and an assumed diameter used for determining the measured value has the opposite sign for the first plurality of geometric properties to the second plurality of geometric properties.

14. A coordinate positioning machine comprising
    a contact probe;
    an articulating device for moving the contact probe; and
    one or more processors for controlling movement of the articulating device to move the contact probe and for receiving signals from the contact probe,
    wherein the one or more processors are arranged to control the articulating device and process the signals from the contact probe to calibrate the contact probe in accordance with claim 1.

15. A method of calibrating a contact probe having a contact element, the method comprising:
    measuring with the contact probe a first geometric property of a calibrated artefact and a second geometric property of the or a further calibrated artefact, the first and second geometric properties being such that a deviation between a measured value and the expected value, resulting from a difference between an effective diameter of the contact element and an assumed diameter used for determining the measured value, has the opposite sign for each of the first and second geometric properties; and
    identifying a difference in the effective diameter of the contact element from the assumed diameter comprising comparing deviations of the measured value to the expected value for each of the first and second geometric properties to determine whether there is a difference in the deviations,
    wherein the expected value is a known dimension for the geometric property and/or known relative location of first and second surfaces.

16. A method of calibrating a contact probe having a contact element having an assumed diameter, the method comprising:
    measuring with the contact probe a plurality of points on a surface of a male artefact and a plurality of points on a surface defining an aperture in a corresponding female artifact;

identifying a difference in a diameter of the contact element from the assumed diameter by comparison of the measured points for each of the male and female artefacts; and determining an effective diameter of the contact probe from the measurements of the plurality of points.

* * * * *